United States Patent [19]
Garschagen et al.

[11] Patent Number: 6,053,676
[45] Date of Patent: Apr. 25, 2000

[54] MACHINE TOOL FOR THE PROCESSING OF ROTATING TOOLS BY MEANS OF A TOOL DRIVEN IN SYNCHRONIZATION WITH A WORK PIECE

[76] Inventors: Friedrich Albert Garschagen, Am Hasenclev 7, Remscheid 42855, Germany; Hans-Udo Heym, Am Waldsaum 13, Wuppertal 42327, Germany

[21] Appl. No.: 09/051,213
[22] PCT Filed: Jul. 29, 1997
[86] PCT No.: PCT/EP97/04107
 § 371 Date: Sep. 11, 1998
 § 102(e) Date: Sep. 11, 1998
[87] PCT Pub. No.: WO98/05461
 PCT Pub. Date: Feb. 12, 1998

[30] Foreign Application Priority Data

Aug. 6, 1996 [DE] Germany .......................... 196 31 673

[51] Int. Cl.[7] .................................................. B23F 1/06
[52] U.S. Cl. .............................. 409/31; 409/10; 409/11; 364/474.02
[58] Field of Search .................. 409/12, 11, 37, 409/1, 17, 19, 51, 25, 28, 31; 451/123; 364/474.01, 474.17, 474.16, 474.02

[56] References Cited

U.S. PATENT DOCUMENTS

| | | | |
|---|---|---|---|
| 3,984,746 | 10/1976 | Dinsdale et al. | 451/123 |
| 4,708,544 | 11/1987 | Faulstich et al. | 409/12 |
| 4,822,219 | 4/1989 | Lunazzi | 409/11 |
| 4,850,760 | 7/1989 | Okunishi | 409/37 |
| 4,865,497 | 9/1989 | Faulstich | 409/12 |

FOREIGN PATENT DOCUMENTS 4114341 11/1992 Germany .

*Primary Examiner*—William Briggs
*Attorney, Agent, or Firm*—Martin A. Farber

[57] ABSTRACT

Machine tool for machining of a rotating workpiece, comprising a tool drive, a workpiece drive for rotatably driving the workpiece, a tool rotationally driven by the tool drive in synchronization with the workpiece for producing a toothing on the workpiece, rotation transmitters for determining rotational condition of the tool and the workpiece, respectively, an electronic control for keeping the workpiece drive and the tool drive in synchronization by respectively associated ones of the rotation transmitters. A positioning motor is associated with one of the two drives for influencing the position of the phases of the two drives, and a sensor element provided in association with one of the two rotation transmitters is rotatably adjustable with respect to a stator of a corresponding one of the drives.

12 Claims, 2 Drawing Sheets

MACHINE TOOL FOR THE PROCESSING OF ROTATING TOOLS BY MEANS OF A TOOL DRIVEN IN SYNCHRONIZATION WITH A WORK PIECE

FIELD AND BACKGROUND OF THE INVENTION

The invention relates to a machine tool for machining rotating workpieces by means of a tool, especially a fly cutter, rotatably driven in synchronization with the workpiece, for producing teeth, with workpiece drive and tool drive being kept in synchronism by respectively associated rotation transmitters by means of electronic control means, with a positioning motor being associated with one of the two drives for influencing the position of the phases of the two drives.

In a known device of this kind (DE 41 14 341 C2), the stator housing at least of the one motor is mounted concentrically with respect to the motor axis and is rotationally adjustable around this axis by means of the positioning motor. This means that the positioning motor is actively engaged forcewise in the power flow of the drive and must therefore be dimensioned to be sufficiently strong.

SUMMARY OF THE INVENTION

It is an object of the invention to provide a machine tool of this type in a manner such that it is simple to manufacture and that the shifting of the phases can be achieved with low power requirement.

According to the invention a sensor element of one of the two rotation transmitters is rotationally shiftable relative to the stator of the corresponding drive motor.

As a result of such a formation, a machine tool according to the invention is obtained in which a change in the position of the phases, directed forward or backward, of the two drives present in synchronous operation is made possible with a reduced expenditure of force. The stator housing need no longer be adjusted rotatably to produce the change of the phases, but only the corresponding rotation transmitter. Therefore, the positioning motor can be designed to be small in terms of force. In practice, this appears so that in order to change the phases for example for producing a helical toothing, the sensor element of the rotation transmitter associated with the drive motor is adjusted rotatably depending on the pitch angle of the toothing. The synchronous control associated with both drive motors thus causes a re-synchronization while producing the phases-shifted synchronous operation of the drives. It is possible for the rotation-adjusting sensor element to be associated with the drive motor for the tool spindle. Alternatively, however, the sensor element of the rotation transmitter can be formed to be rotationally adjustable relative to the stator of the tool spindle drive motor. A modification of the concept according to the invention that is favorable from a constructive standpoint is characterized by the signal disc being arranged non-rotatably on the drive shaft separated from the drive motor and by the annular carrier being traversed freely rotatably by the shaft and being rotationally displaceable by the positioning motor. The annular carrier is the carrier for the adjustable sensor element. For the purpose of changing the condition of the phases in the synchronous operation of the tool drive and workpiece drive, the positioning motor effects a rotational displacement of the annular carrier. Initially, the synchronous operation of the drive motors that are driven electrically is re-regulated by means of the electronic control provided with such machine tools. Helical teeth can be produced by means of the formation according to the invention with an angle of maximum plus or minus 45°. In its turn, the annular carrier is likewise provided with a signal disc that is scanned by the sensor that is secured to the housing. By means of this sensor, the angle of the phases can be detected by a CNC control so that the corresponding command can be input from the latter for the production of a helical toothing for example. If there is no rotational adjustment of the annular carrier together with the sensor element mounted thereon, straight teeth will be produced on the workpiece. By a corresponding control with respect to the rotational adjustment of the concerned sensor, nonlinear helical teeth could also be produced.

BRIEF DESCRIPTION OF THE DRAWINGS

With the above and other objects and advantages in view, the present invention will become more clearly understood in connection with the detailed description of a preferred embodiment, when considered with the accompanying drawings of which.

DETAILED DESCRIPTION OF THE PREFERRED EMBODIMENT

Figure 1:
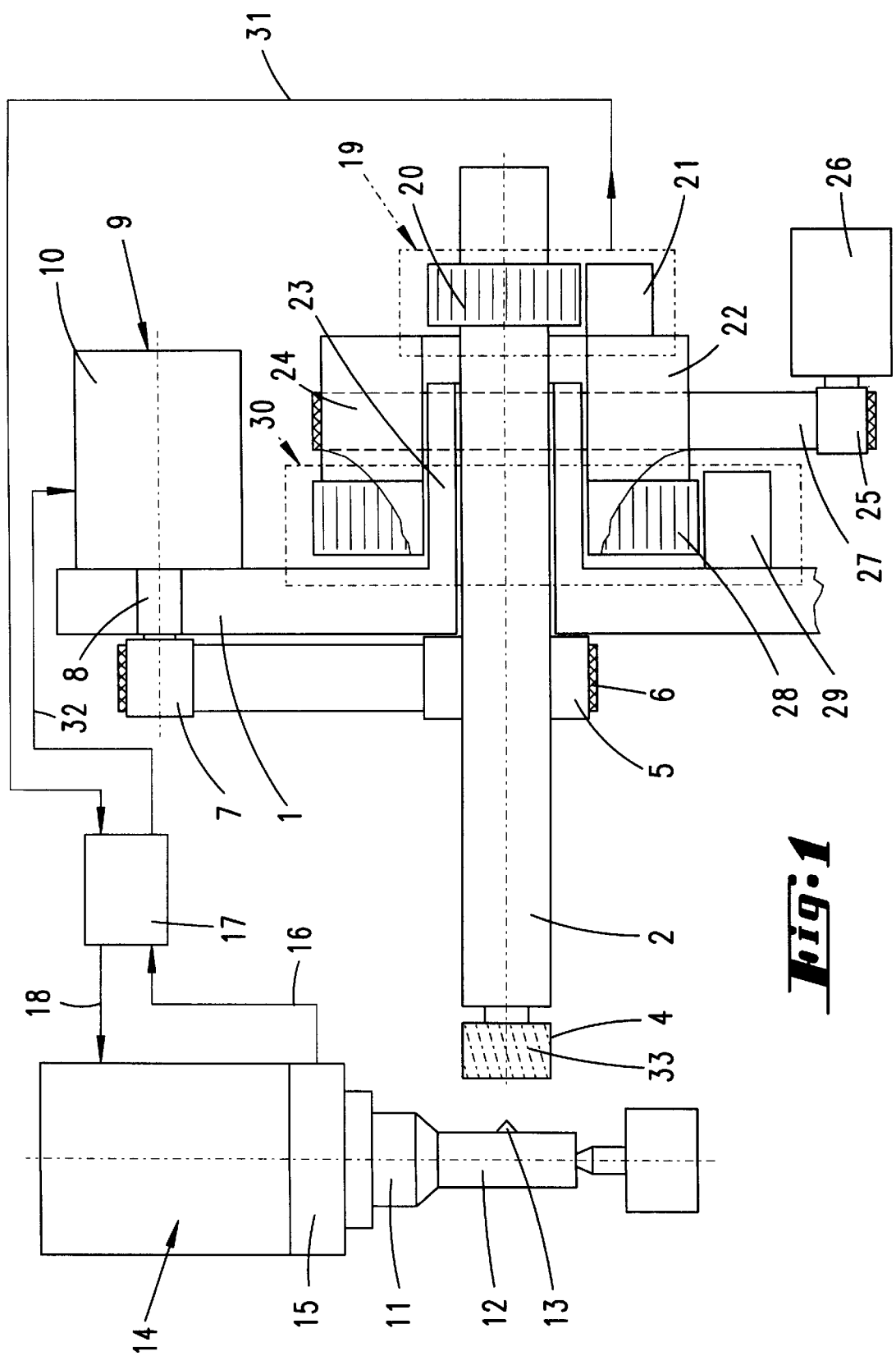
FIG. 1 a schematic diagram of a machine tool in the vicinity of the two drives for the tool spindle and workpiece spindle.
Figure 2:
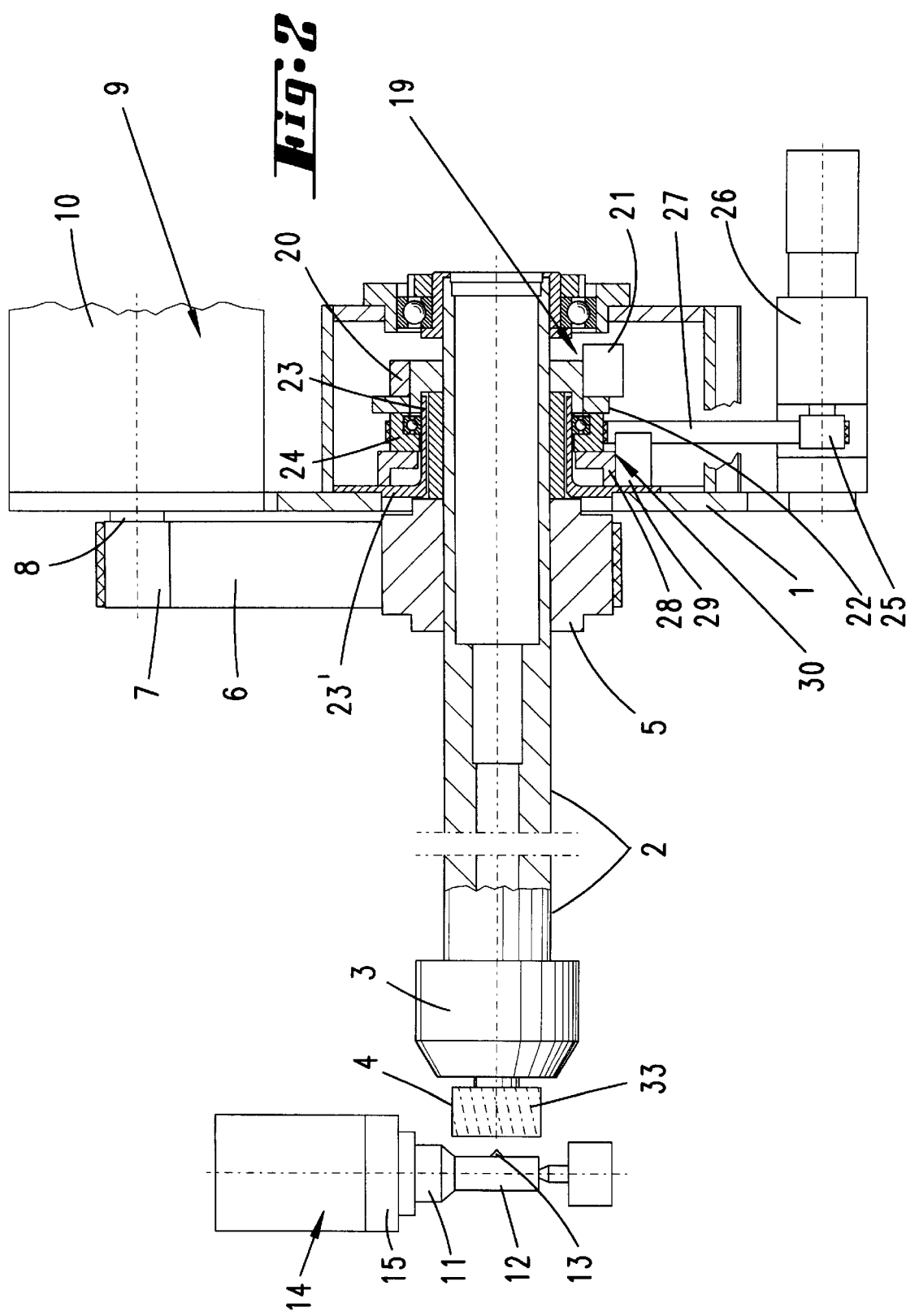
FIG. 2 likewise illustrated simplified, shows partly in cross-section the machine tool with the workpiece spindle aligned horizontally with tool spindle crossing the latter.

Regarding the machine tool shown, it is a fly cutter milling machine. The latter has a workpiece spindle 2 that is mounted horizontally on the machine frame 1. The one end of the spindle carries a chuck 3 for a gear blank 4 to be provided with teeth.

A toothed pulley 5 is fixed non-rotatably on the workpiece spindle 2. A toothed flat belt 6 guided around the pulley engages a drive pulley 7, which pulley is fixed on the drive shaft 8 of a drive 9 formed as an asynchronous motor. The stator 10 of the drive, which stator surrounds the rotor, not shown, is fastened to the machine frame 1.

A tool spindle 11 extends crossing the workpiece spindle 2, the tool spindle in turn carrying a milling shaft 12 with a tool 13 that projects radially and is formed as a fly cutter. The milling shaft 12 is caused to rotate by a drive 14 associated therewith, likewise formed as an asynchronous motor. Both drives 9 and 14 are kept in synchronization with one another by means of electronic control means. For this purpose, drive 14 has a schematically indicated first rotation transmitter 15. The latter registers the rotational speed of the drive 14 and transmits the rotational speed thus determined over a line 16 to a synchronization control device 17. A line connection 18 also runs from this synchronization control device 17 to the drive 14.

A second rotation transmitter 19 is associated with the drive 9. This rotation transmitter however is not incorporated into the drive 9, but is provided in the vicinity of the workpiece spindle 2. In particular, this second rotation transmitter 19 incorporates a signal disc 20 with sensor element 21 associated with the signal disc, the signal disc being non-rotatably mounted on the drive shaft (workpiece spindle 2) separated from the drive motor 9. The sensor element 21 is mounted on an annular carrier 22 which carrier is freely traversed by the workpiece spindle 2. The annular carrier is freely rotatably mounted on a sleeve 23 that surrounds the workpiece spindle 2, the sleeve in its turn being flanged to the machine frame 1. The middle section 24 of the annular carrier 22 is formed as a pulley. A toothed, flat belt 27 that runs to a pulley 25 of a positioning motor 26 is positioned around this section 24. The positioning motor 26 in its turn is held in a fixed position on the machine frame 1 in a manner not shown.

On the side opposite to the sensor element 21, the annular carrier 22 forms a signal disc 28 which in its turn cooperates with a sensor 29 fastened on the flange 23' of the sleeve 23. The sensor 29 non-rotatably arranged forms a third rotation transmitter 30 in conjunction with the corresponding signal disc 28.

The production of a helical toothing 33 requires rotational displacement of the sensor element 21. This is accomplished by means of the positioning motor 26, which rotates the annular carrier 22 relative to the drive shaft and respectively workpiece spindle 2. The shift of phases that thus occurs is registered by the rotation transmitter 19 as a deviation from synchronous operation and is transmitted over a line 31 to the synchronization control device 17, which is connected through another line connection 32 with the drive 9. Now there results re-synchronization of either the drive motor 14 or the drive motor 9 with attaining phases-shifted synchronous operation of workpiece drive 9 and tool drive 14. The third rotation transmitter 30 is connected to the CNC control, not shown, of the machine tool. The corresponding angular position of the sensor element 21 can be determined by comparing the output pulses of the rotation transmitters 19 and 30 which feed values to the CNC control.

We claim:

1. Machine tool for machining of a rotating workpiece, comprising
   a tool drive,
   a workpiece drive for rotatably driving the workpiece,
   a tool rotationally driven by said tool drive in synchronization with the workpiece, for producing a toothing on the workpiece,
   rotation transmitters for determining rotational condition of said tool and said workpiece, respectively,
   electronic control means for keeping said workpiece drive and said tool drive in synchronization by respectively associated of said rotation transmitters,
   a positioning motor associated with one of the two drives for influencing position of phases of the two drives, and
   a sensor element provided in association with one of the two rotation transmitters, and means providing said sensor element to be rotatably adjustable with respect to a stator of a corresponding one of the drives.

2. Machine tool according to claim 1, wherein
   said one rotation transmitter further comprises a signal disc non-rotatably provided on a drive shaft separated from the corresponding drive, and
   an annular carrier freely rotatably traversed by the drive shaft and rotatably displaceable by the positioning motor, said annular carrier mounting thereon the adjustable sensor element.

3. Machine tool according to claim 2, further comprising
   a housing,
   a sensor mounted on the housing,
   said annular carrier has a signal disc that is scanned by said sensor fixed with the housing.

4. Machine tool according to claim 2, wherein said drive shaft is a workpiece spindle carrying said workpiece.

5. Machine tool according to claim 2, wherein said corresponding drive is said workpiece drive.

6. Machine tool according to claim 1, wherein said tool is a fly cutter for producing teeth on the workpiece.

7. Machine tool according to claim 1, wherein said workpiece drive is a drive motor.

8. Machine tool according to claim 2, wherein said workpiece drive is a drive motor.

9. Machine tool according to claim 8, wherein said drive motor is an asynchronous motor.

10. Machine tool according to claim 1, wherein said positioning motor is operatively connected to said sensor element for rotatably adjusting said sensor element.

11. Machine tool according to claim 1, wherein said corresponding drive is said tool drive.

12. Machine tool according to claim 1, wherein said workpiece drive and said tool drive are asynchronous motors.

* * * * *